P. F. HABERSTICK.
EMERGENCY TRACTION DEVICE.
APPLICATION FILED NOV. 8, 1916.

1,245,219.

Patented Nov. 6, 1917.

WITNESSES
W. F. Keefer.
J. S. Porter.

INVENTOR-
P. F. Haberstick
BY
N. E. Dunlap
ATTORNEY

UNITED STATES PATENT OFFICE.

PETER F. HABERSTICK, OF WHEELING, WEST VIRGINIA.

EMERGENCY TRACTION DEVICE.

1,245,219.  Specification of Letters Patent.  Patented Nov. 6, 1917.

Application filed November 8, 1916. Serial No. 130,126.

*To all whom it may concern:*

Be it known that I, PETER F. HABERSTICK, a citizen of the United States of America, and resident of Wheeling, county of Ohio, and State of West Virginia, have invented certain new and useful Improvements in Emergency Traction Devices, of which the following is a specification.

This invention relates to traction assisting devices for automobiles, and it has for its primary object to provide a simple and inexpensive emergency accesory whereby the traction wheels of automobiles may be readily afforded traction for pulling out of ruts, mud holes and the like.

A further object is to structurally improve that class of accessories disclosed in Patent No. 1,144,540, granted to me on the 29th day of June, 1915.

In describing the invention in detail reference is herein had to the accompanying drawings, in which—

Figure 1:
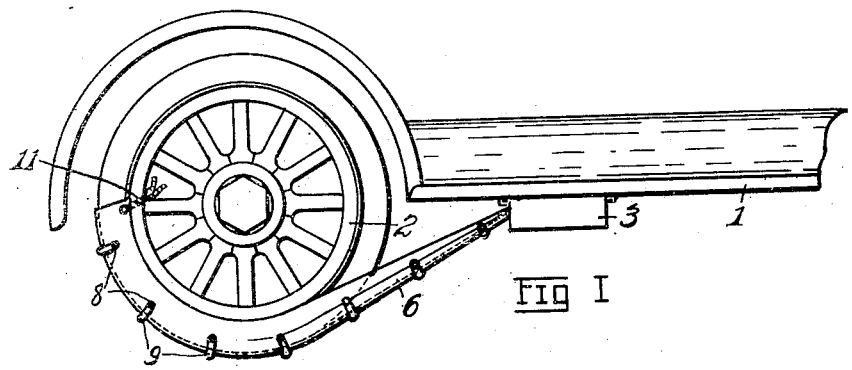
Figure 1 is a side elevation of the rear part of an automobile showing the invention applied in working position.

Referring to said drawings, 1 indicates the usual running board and 2 a traction wheel of an automobile. Removably mounted on the underside of said running board adjacent to the rear end of the latter is a metal casing 3 having an opening 4 in its rear end. Said casing is adapted to receive therein a box or carton, as 5, in which is packed a strip 6 of a suitable fabric which is designed, when occasion requires, to have an end projected outward through said opening 4 and through a registering opening, as 7, in the adjacent end of the carton for attaching to the wheel 2, after which it may be wholly withdrawn from said carton by traction movement of the wheel. As so withdrawn, the fabric strip is spread in the path of travel of the wheel, affording a dry surface upon which said wheel may readily advance.

For affording efficient means for preventing slipping of the fabric strip on the ground under the impelling force of the spinning wheel, said strip has fixed on the outer, or road-engaging, surface thereof a plurality of spaced transverse cleats consisting of short lengths of a flexible material, preferably a twist-fiber rope 8, which is incased in sheaths 9 of a suitable strong fabric. Said sheaths closely embrace the ropes 8 and each preferably has its lateral edges disposed in overlapped relation and stitched or otherwise rigidly attached to the strip 6.

Figure 4:
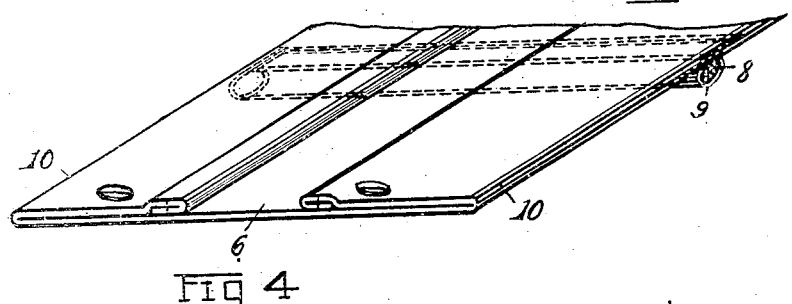
Fig. 4 is an enlarged perspective view of an end of the fabric strip illustrating the same in the condition in which it is packed.

When the width of the required carton 5 and casing 3 is limited to such an extent that the latter is accommodated by running boards 1 of the usual widths, a fabric strip 6 of sufficient width to overlap the sides of the wheel-tire cannot be accommodated in open or spread condition by such carton. Therefore, to permit the use of a strip of the proper width to incase the sides as well as the thread of the tire and to adapt the same to the restricted width of casing 3, and at the same time to provide for the withdrawal of the strip in a form for assuming proper embracing relation to the tire, I fold the opposite lateral edges of said strip longitudinally over the inner, or tire-engaging, surface thereof, as shown at 10 in Fig. 4.

The length of the cleats aforesaid is sufficiently less than the width of the strip 6 that their ends fall short of the points where the longitudinal folds 10 occur, as shown.

Figure 2:
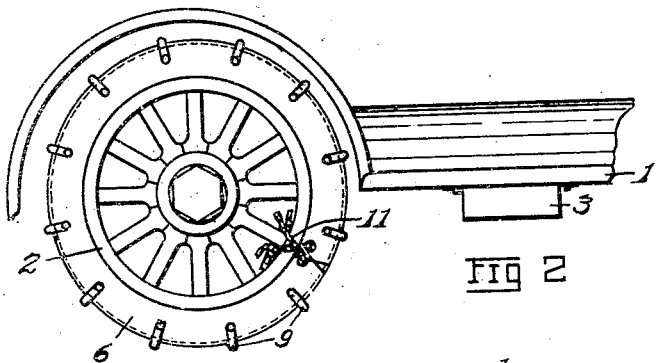
Fig. 2 is a similar view showing the fabric strip secured in incasing relation to a tire.
Figure 3:
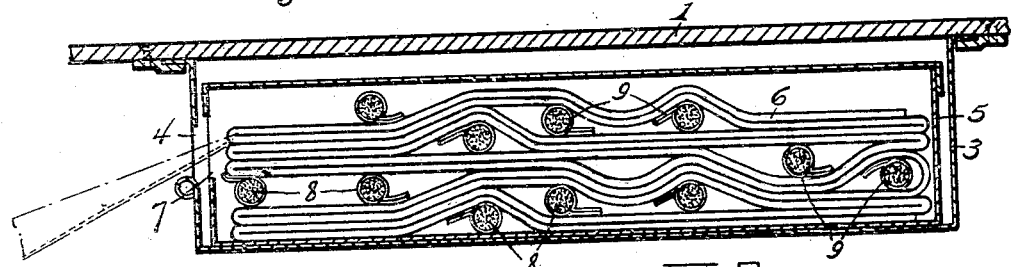
Fig. 3 is an enlarged longitudinal section of the metal casing and fabric-inclosing carton, showing the fabric strip packed in the latter; and—

The strip 6, folded longitudinally as aforesaid, is disposed within the carton 5 in superposed layers, as shown in Fig. 3. When its use is required, the carton is placed within the casing 3 which latter is then mounted on the running board. The uppermost end of said strip is passed outward through the registering openings 4 and 7 and is attached to the wheel 2, as by means of suitably attached cords 11. Forward rotation of the wheel then acts to withdraw the strip and to wind the same about the tire. When the strip has been wholly withdrawn, the opposite end thereof may be attached to the wheel, as shown in Fig. 2, in which position a tire-incasing tread is constituted. The flexible cleats presented to the road surface creep forward and act to prevent spinning of the wheel much in the manner of the "creeping" cross-chains of a common form of anti-skid tire chains, and are consequently particularly effective for affording traction to the wheels in wet or slippery places.

What is claimed is—

1. An emergency traction device for vehicles, comprising a casing adapted for mounting in a stationary position in front of a traction wheel, a fabric strip of greater width than said casing disposed within the latter, said strip having its lateral edges folded inward, means for attaching an end of said strip to said wheel, and flexible cleats attached to said strip.

2. An emergency traction device for vehicles, comprising a casing adapted for mounting in a stationary position in front of a traction wheel, a fabric strip of greater width than said casing disposed within the latter, said strip having its lateral edges folded inward, means for attaching an end of said strip to said wheel, and flexible cleats attached to said strip between said folds, said cleats having a length approximating the width of that portion of the strip between said folds.

In testimony whereof, I affix my signature in presence of two subscribing witnesses.

PETER F. HABERSTICK.

Witnesses:
H. E. DUNLAP,
G. O. SMITH.

Copies of this patent may be obtained for five cents each, by addressing the "Commissioner of Patents, Washington, D. C."